United States Patent Office 3,361,489
Patented Jan. 2, 1968

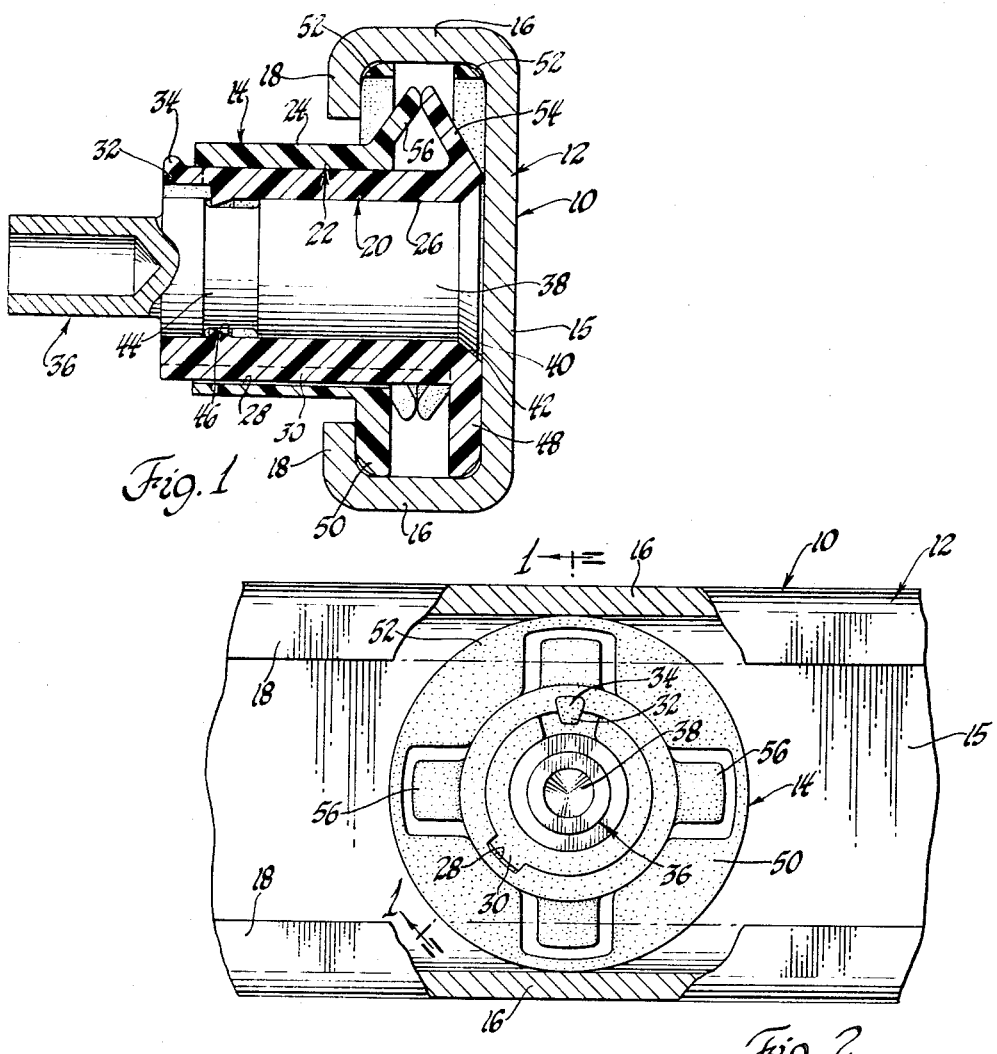
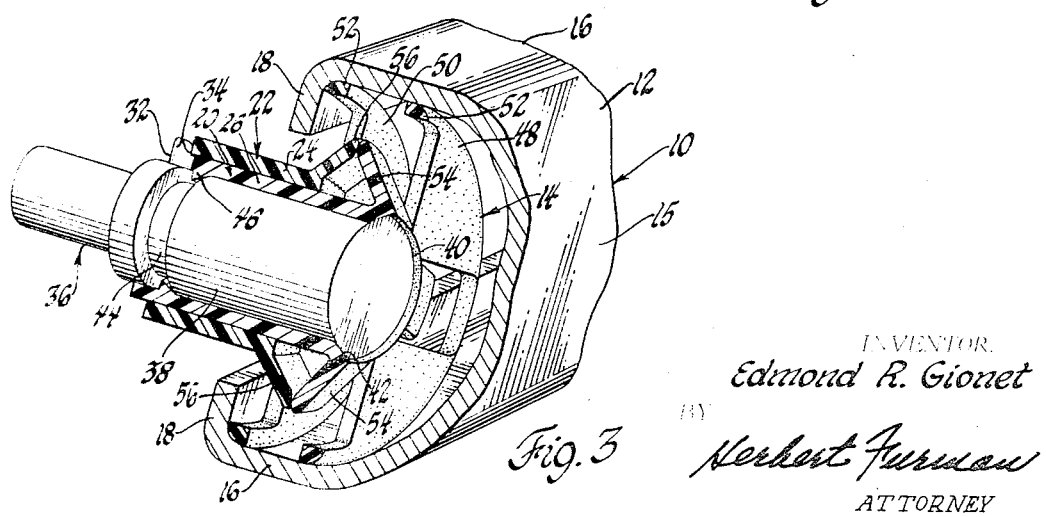

3,361,489
GUIDE ROLLER ASSEMBLY
Edmond R. Gionet, Warren, Mich., assignor to General Motors Corporation, Detroit, Mich., a corporation of Delaware
Filed Mar. 14, 1966, Ser. No. 534,103
5 Claims. (Cl. 308—3.8)

This invention relates to guide roller assemblies and more particularly to split type guide roller assemblies.

One feature of this invention is that it provides an improved split type guide roller assembly including a pair of roller portions received between spaced walls of a channel member and integral means on each of the roller portions biasing the portions apart with respect to each other and into engagement with a respective wall of the channel member. A further feature of this invention is that the integral means comprise projections which extend angularly from each roller portion and are arranged in complementary pairs located between the roller portions and in resilient engagement with each other. A further feature of this invention is that each of the roller portions includes an annular body having a continuous annular outer periphery and the projections extend from the body inwardly of the periphery. Yet another feature of this invention is that the roller portions include hub portions telescopically located with respect to each other and provided with cooperating means limiting the roller portions to corotation as a unit. Yet a further feature of this invention is that one of the hub portions receives a stud for mounting the guide roller assembly on a support member and includes means cooperating with means on the stud for axially locating the one roller portion with respect to the stud.

These and other features of the guide roller assembly of this invention will be readily apparent from the following specification and drawings wherein:

FIGURE 1 is a sectional view of a guide roller assembly according to this invention taken generally along the plane indicated by line 1—1 of FIGURE 2;

FIGURE 2 is a partially broken away elevational view of the guide roller assembly; and FIGURE 3 is a broken away perspective view.

Referring now to the drawings, a guide roller assembly 10 according to this invention includes a channel member 12 and a guide roller 14 which is received within the channel member. The channel member 12 includes a side wall 15 and a pair of end walls 16 which extend laterally of wall 15 and are joined to spaced portions of a side wall 18.

The guide roller 14 includes an inner roller portion or member 20 and an outer roller portion or member 22 of resilient plastic material, such as nylon. Member 22 includes an annular hub portion 24 which is received over an annular hub portion 26 of member 20 to locate these members in telescopic relationship with respect to each other. Hub portion 24 includes a longitudinal groove 28 which receives a longitudinal rib 30 of hub portion 26 to key members 20 and 22 to each other for corotation as a unit. Hub portion 26 includes an integral projecting tab 32 having a shoulder 34 which is located adjacent the free end of hub portion 24 when the members have been assembled with respect to each other to limit sliding movement of the hub portions with respect to each other.

A stud 36 includes an annular body 38 and a frustoconical head 40. Stud 36 is received within the hub portion 26 of member 20 with the head portion thereof in engagement with a complementary tapered seat 42 of member 20. Stud 36 is provided with an annular groove 44 and a tapered annular rib 46 of hub portion 26 fits within the groove 44 when the stud has been inserted within member 20 to thereby ensure seating of the head 40 of the stud against the seat 42 of member 20.

The member 20 includes an integral annular body 48 which seats on wall 12 and member 22 includes an integral annular body 50 which seats on wall 18. The diameter of the bodies 48 and 50 is generally equal to the distance between the end walls 16 of channel member 12 and the outer peripheral portions 52 of each of the bodies 48 and 50 are shaped so as to conform to the arcuate juncture shoulders between the walls 15 and 16 and 16 and 18.

The annular body 48 is provided with four circumferentially spaced integral deflectable tabs or projections 54 which extend angularly therefrom and likewise body 50 is provided with four tabs 56 which are complementary to tabs 54. The tabs 54 and 56 have their free end portions in sliding engagement with each other and are deflected radially outwardly of their normal position to provide a resilient bias urging bodies 48 and 50 apart with respect to each other and into engagement with their respective walls 15 and 18. The key arrangement provided by groove 28 and rib 30 provide means for indexing the members 20 and 22 with respect to each other to ensure that the tabs 54 and 56 are axially aligned so as to engage each other.

It will be noted that the tabs 54 and 56 are located intermediate the roller members 20 and 22 and, further, that each of the roller members is provided with a continuous outer peripheral portion 52 to provide smooth relative movement between the guide channel 12 and the roller member 14.

In certain mechanisms or during movement between certain portions of the mechanism, the stud 36 may tilt or be located angularly with respect to the guide channel 12 rather than normal thereto as shown. If this does occur, the annular bodies 48 and 50 will, of course, have to move toward each other and the integral deflectable projections 54 and 56 will, of course, permit such movement but still maintain as much engagement as possible between the peripheral portions 52 of the bodies and the walls of the channel member 10 as well as provide a resilient bias tending to return the bodies 48 and 50 to their normal position as shown. By thus permitting the stud 36 to swivel or tilt with respect to the guide channel 12, the tabs 54 and 56 permit a wide range of usage of the guide roller assembly of this invention.

Thus, this invention provides an improved guide roller assembly.

I claim:

1. The combination comprising, a channel member having spaced side walls, a roller member having spaced roller portions received between the spaced walls of the channel member, each of said roller portions engaging a respective wall of said channel member, and a number of integral deflectable projections on each of said roller portions, said projections being located intermediate said roller portions and being engageable with each other to bias said roller portions oppositely and apart with respect to each other and into engagement with respective walls of the channel member.

2. The combination recited in claim 1 wherein said roller portions include hub portions telescopically located with respect to each other.

3. The combination recited in claim 1 wherein said roller portions include cooperating means providing rotation of said roller portions as a unit.

4. The combination recited in claim 1 wherein said channel member includes end walls interconnecting said side walls, each of said roller portions including a continuous outer peripheral portion engaging a respective side wall and adjacent end wall, each of said projections extending from its respective roller portion toward a peripheral portion of the other roller portion.

5. The combination recited in claim 1 wherein each of said roller portions includes an annular body engageable in surface-to-surface relationship with a respective side wall, said projections extending radially and angularly from said annular body, said body including a continuous outer peripheral portion engageable with a respective side wall and with spaced end walls of said channel member interconnecting said spaced side walls.

References Cited

UNITED STATES PATENTS 2,230,615  2/1941  Dick _____ 16—97
2,912,288  11/1959  Griswold _____ 308—6

MARTIN P. SCHWADRON, *Primary Examiner.*

ROBERT A. DUA, *Examiner.*